United States Patent [19]

Heffner et al.

[11] 4,257,150

[45] Mar. 24, 1981

[54] APPARATUS FOR ASSEMBLING WALL MODULES FROM A PAIR OF STRETCHED SHEETS OF METAL LATERALLY SPACED APART BY A SKELETAL FRAME

[75] Inventors: George R. Heffner, La Verne; Max Casutt, San Diego, both of Calif.

[73] Assignee: Grumman Flexible Corporation, Delaware, Ohio

[21] Appl. No.: 957,306

[22] Filed: Nov. 2, 1978

[51] Int. Cl.³ .............................................. B23P 11/00
[52] U.S. Cl. .................... 29/33 K; 29/448; 29/779; 156/79; 156/160
[58] Field of Search ............... 29/448, 819, 820, 33 K, 29/455 LM, 779, 446; 156/79, 160, 163, 494; 52/309.9

[56] References Cited

U.S. PATENT DOCUMENTS

| | | | |
|---|---|---|---|
| 2,342,025 | 2/1944 | Watter | 29/447 |
| 3,777,347 | 12/1973 | McCorvey | 29/779 X |
| 3,793,118 | 2/1974 | Gilles et al. | 156/494 X |
| 3,840,960 | 10/1974 | Toti | 29/779 X |
| 4,058,883 | 11/1977 | Yoshida | 29/448 |
| 4,147,582 | 3/1979 | Brollo | 156/79 |

FOREIGN PATENT DOCUMENTS 1081581 12/1954 France ..................... 156/160

Primary Examiner—William R. Briggs
Attorney, Agent, or Firm—Charles C. Logan, II

[57] ABSTRACT

Apparatus for assembling a wall module from a plurality of stretched sheets of metal laterally spaced apart by a skeletal frame with the interior of the wall module to be later filled with structural foamed plastic. The apparatus has a first and a second elongated sheet metal stretcher assembly, a pair of tower assemblies for supporting the first elongated sheet metal stretcher assembly vertically above the second elongated sheet metal stretcher assembly, and a plurality of jack screw assemblies for moving the first elongated sheet metal stretcher assembly vertically toward or away from the second elongated sheet metal stretcher assembly. Both of the elongated sheet metal stretcher assemblies have sheet metal clamping jaws longitudinally fixedly mounted adjacent one of their ends and longitudinally movable sheet metal clamping jaws mounted adjacent their other end. The longitudinally movable sheet metal clamping jaws have a jack screw assembly connected to one of the fixed jaw members for transporting the longitudinally movable sheet metal clamping jaws in a longitudinal direction away from the longitudinally fixedly mounted sheet metal clamping jaws mounted adjacent the other end of the sheet metal stretcher assembly.

24 Claims, 9 Drawing Figures

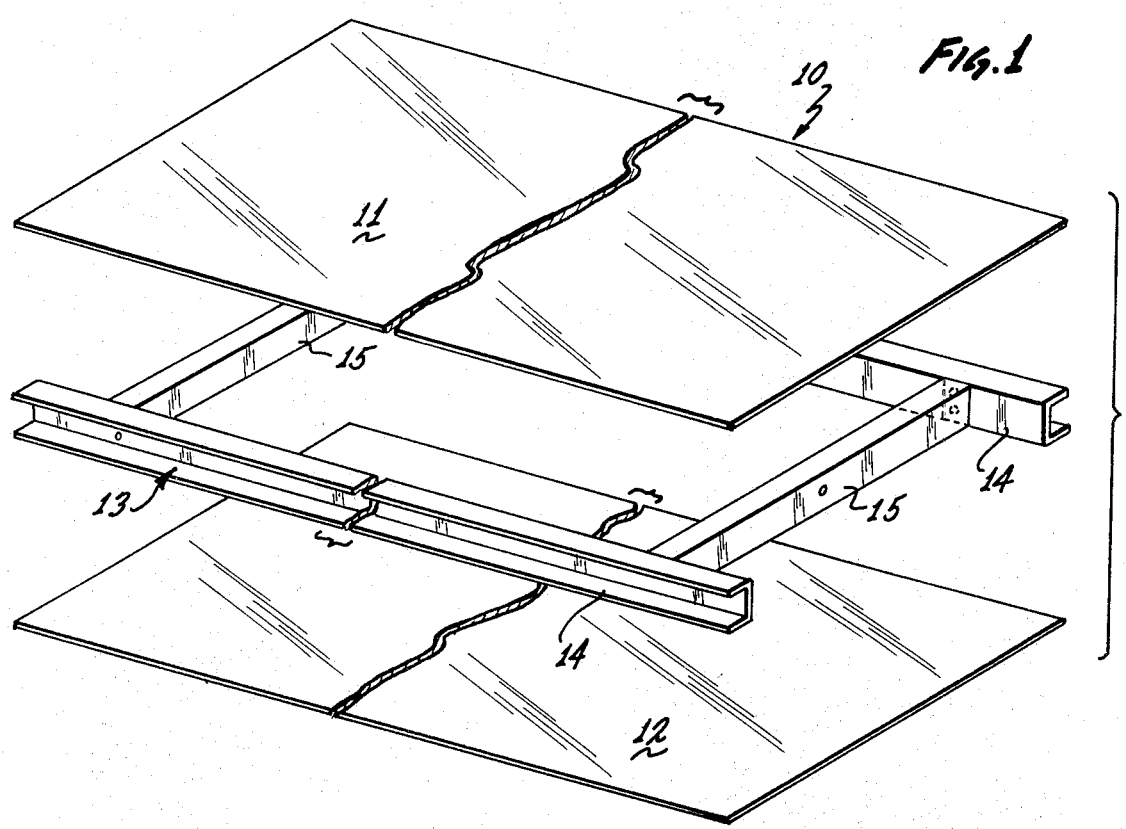
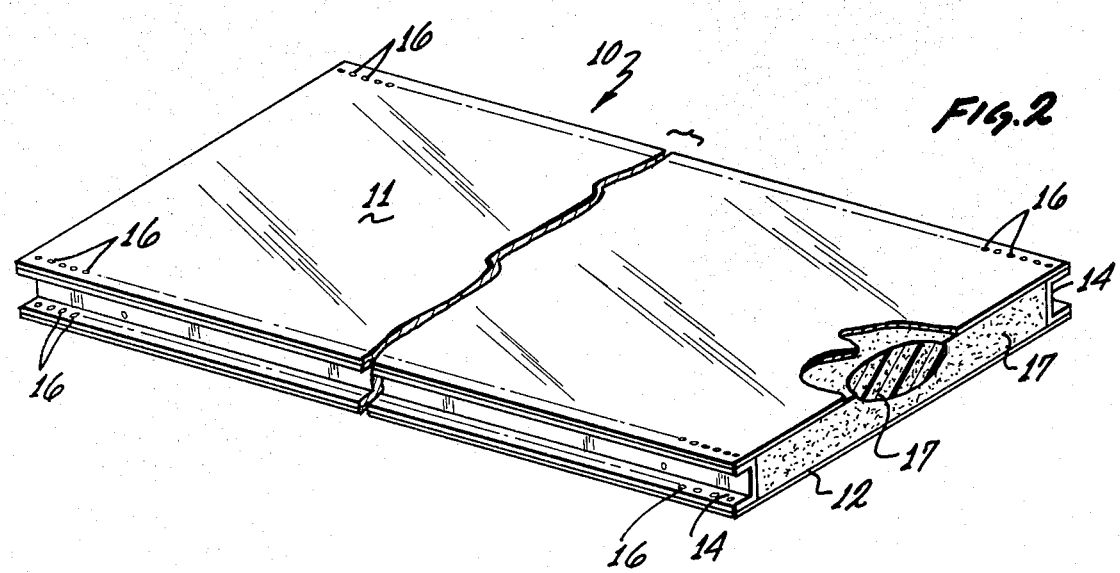

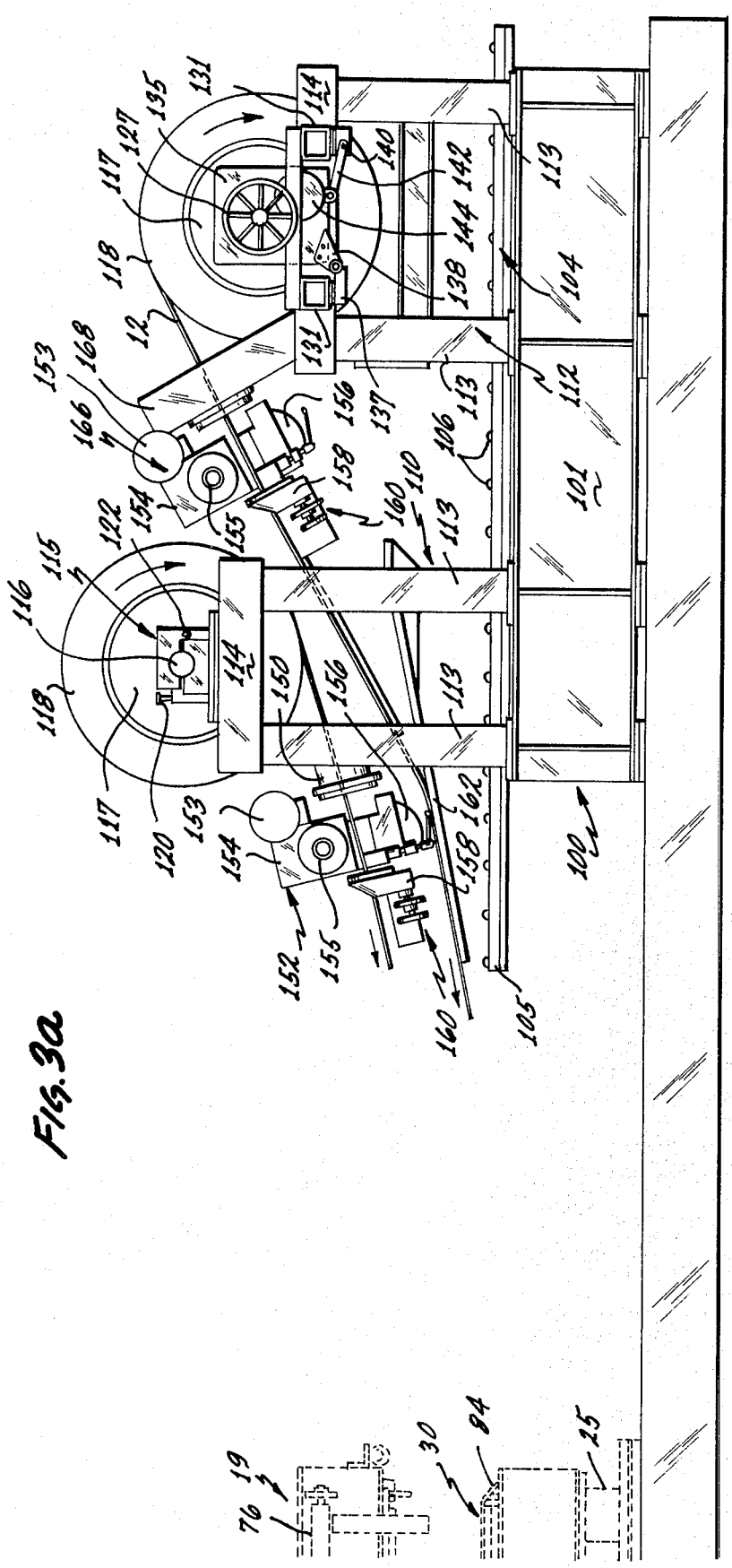

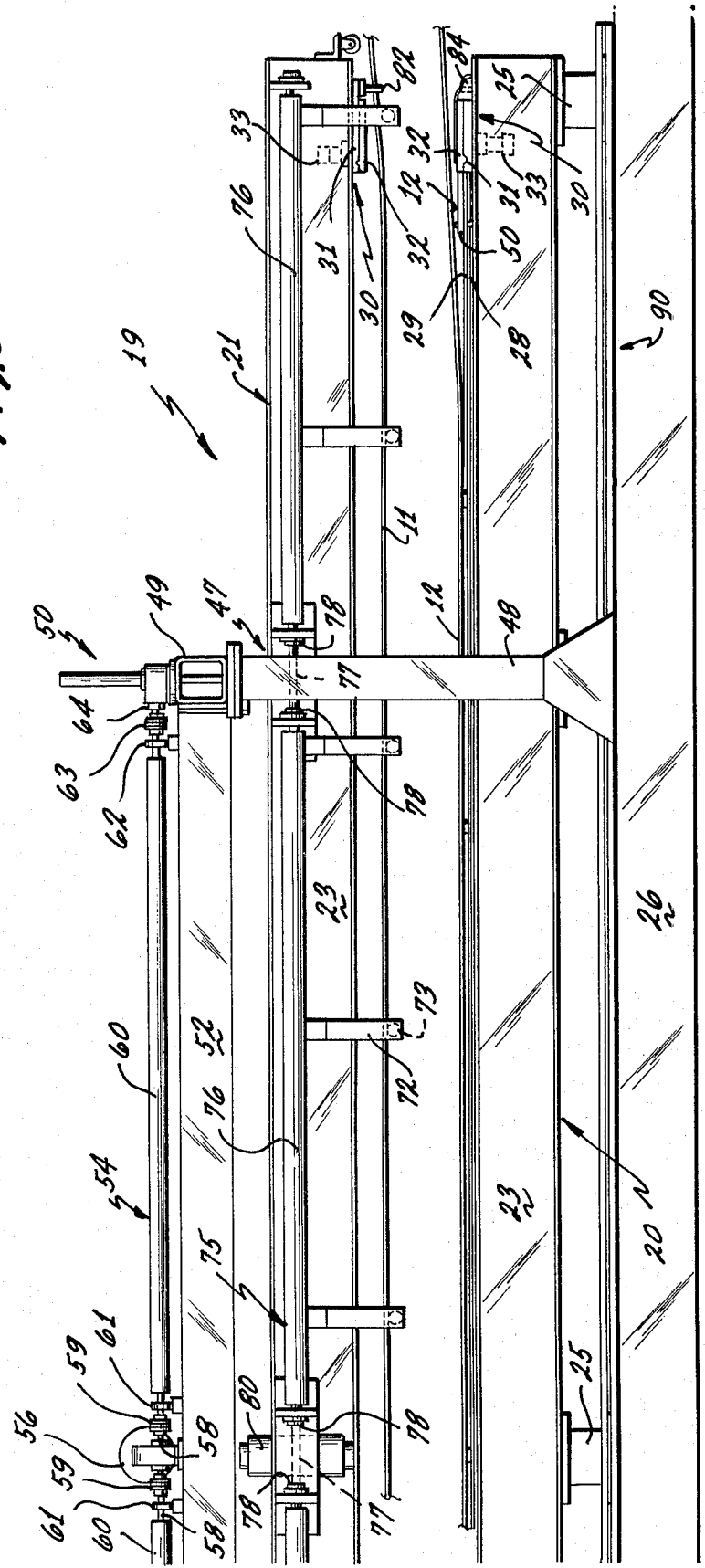

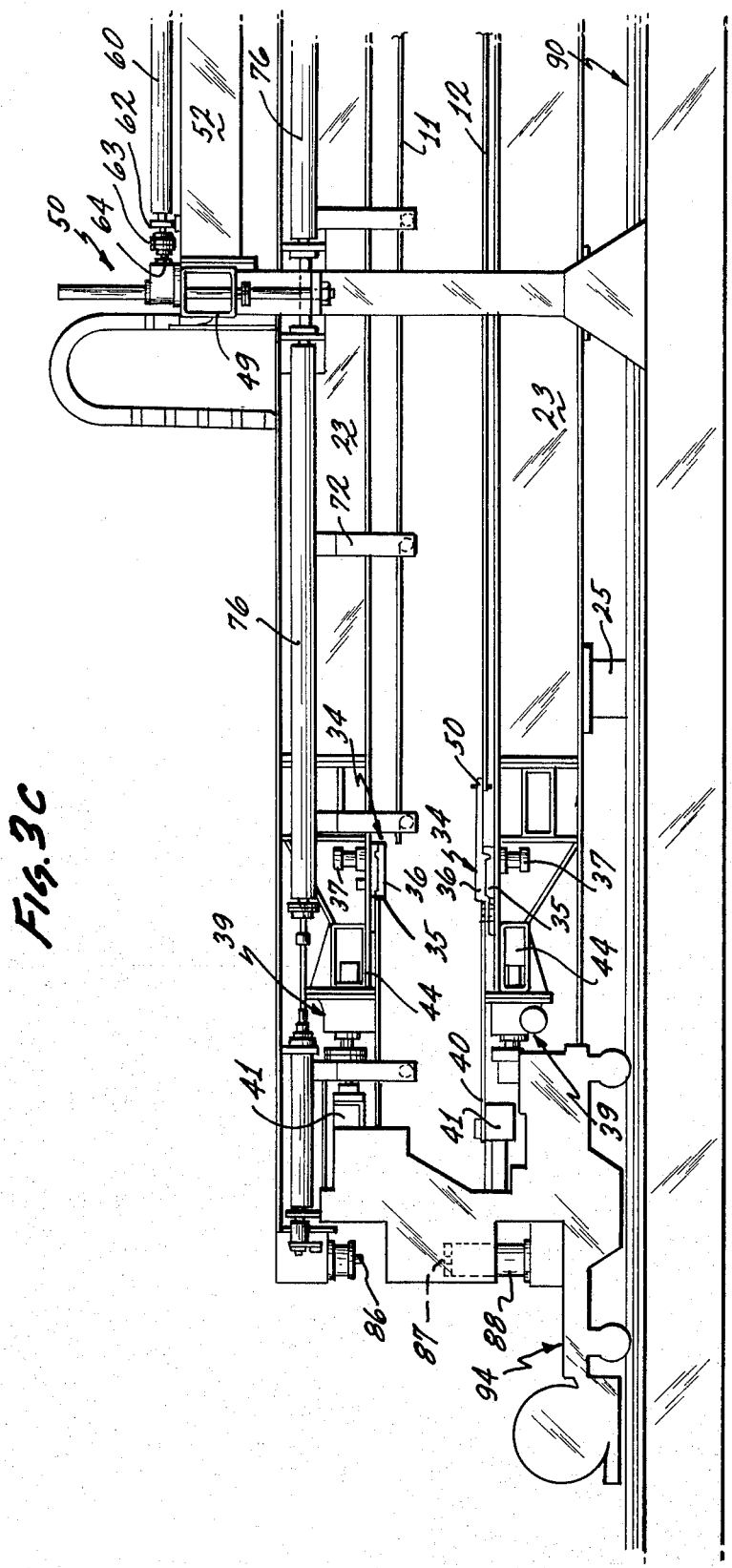

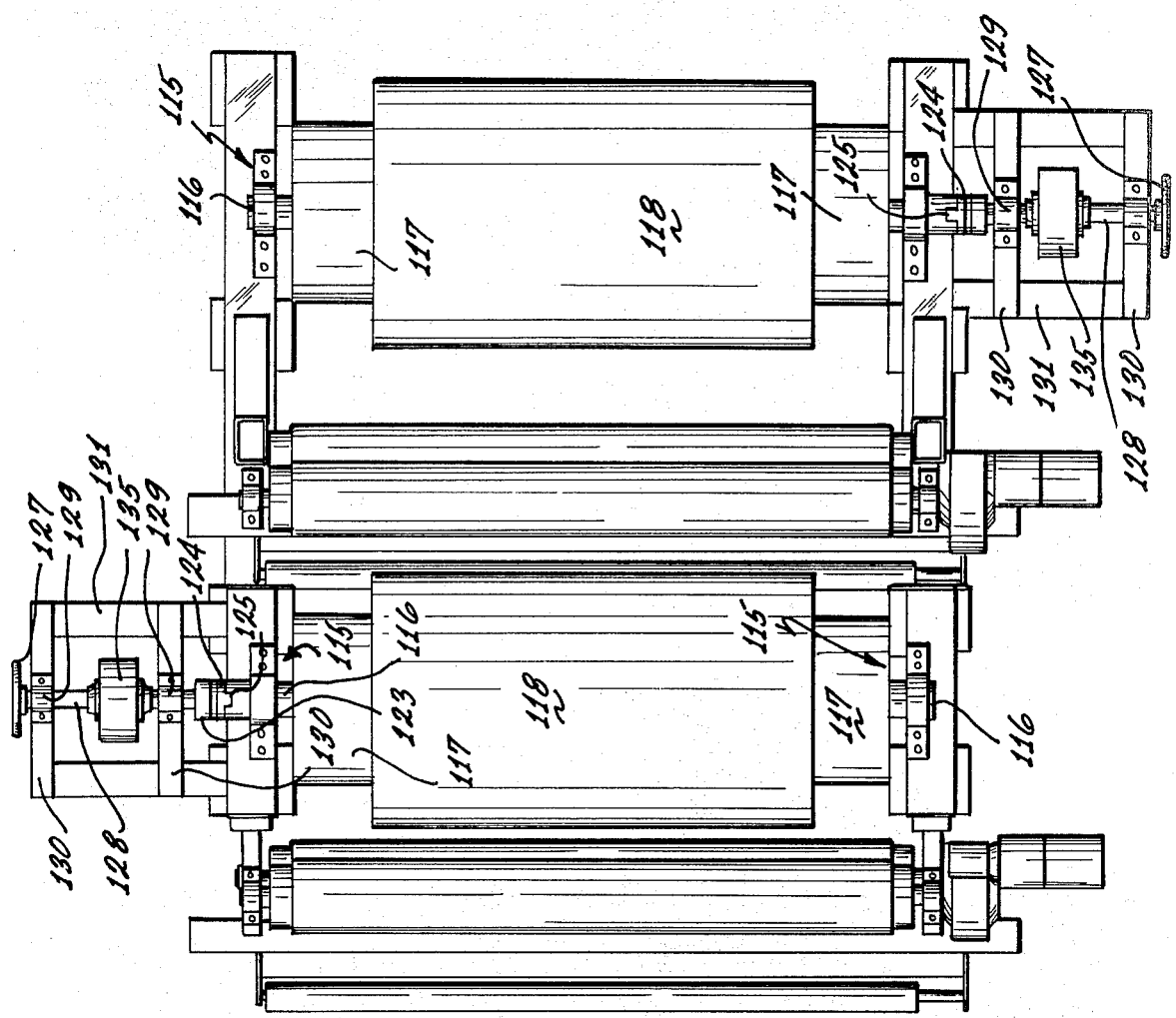

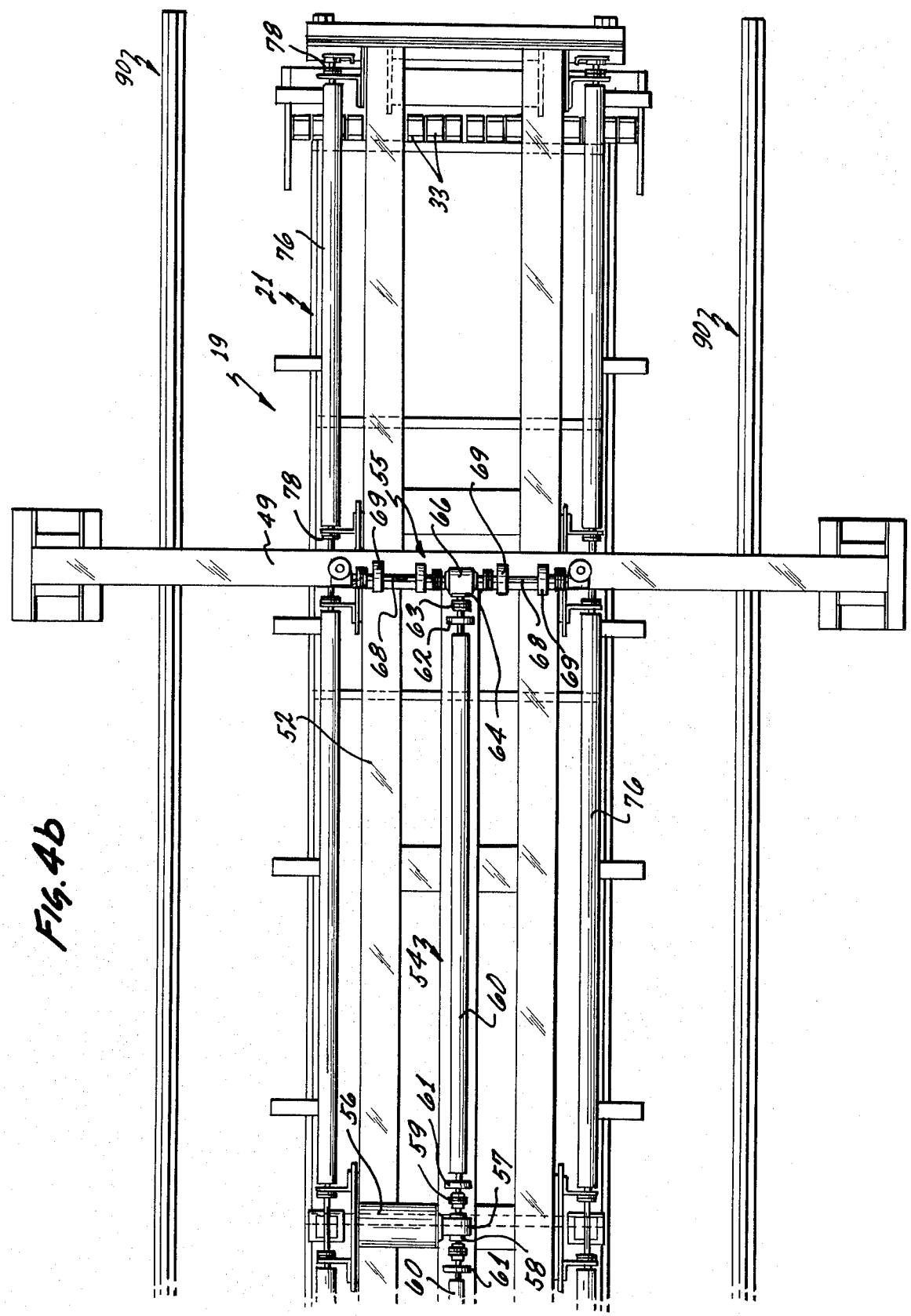

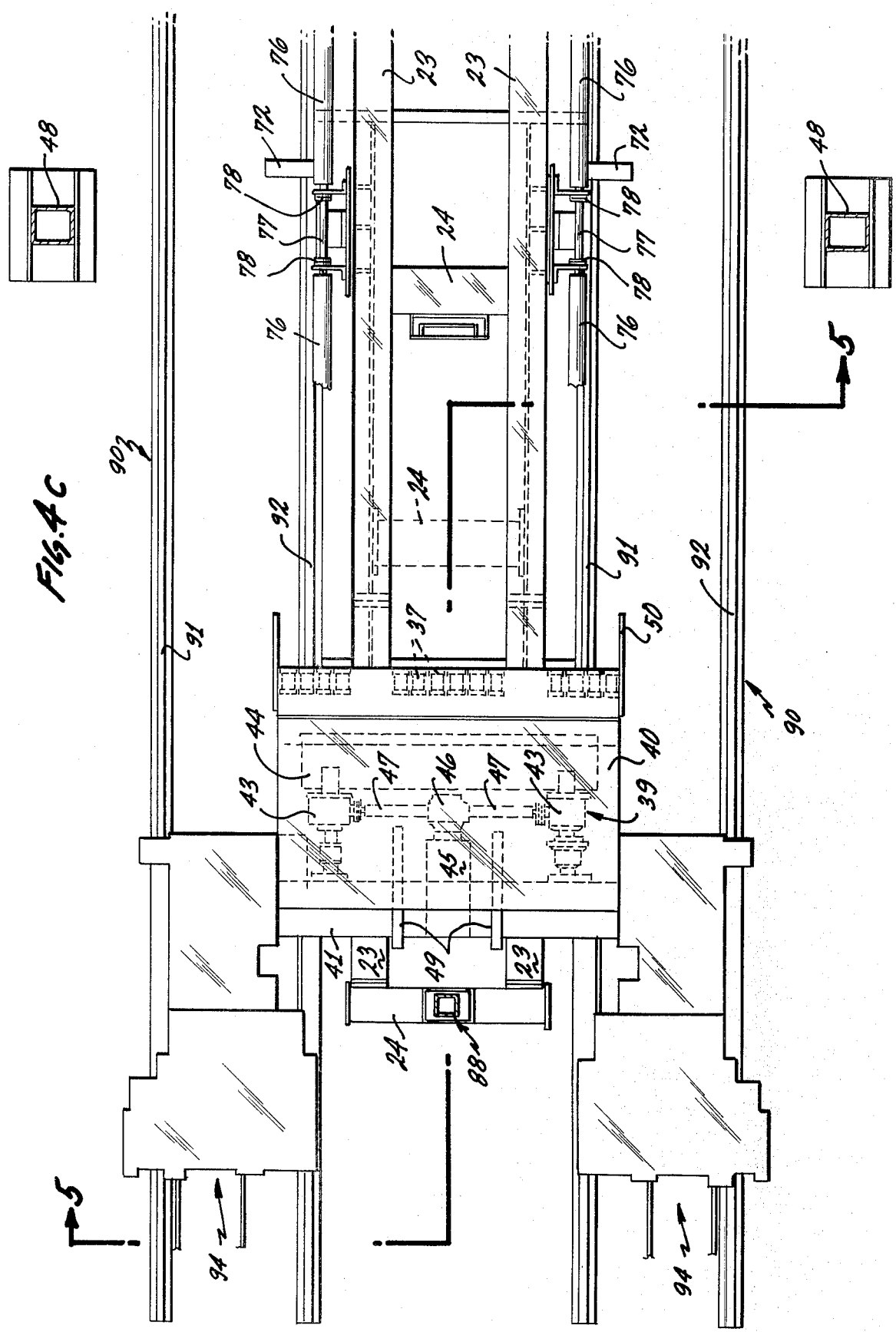

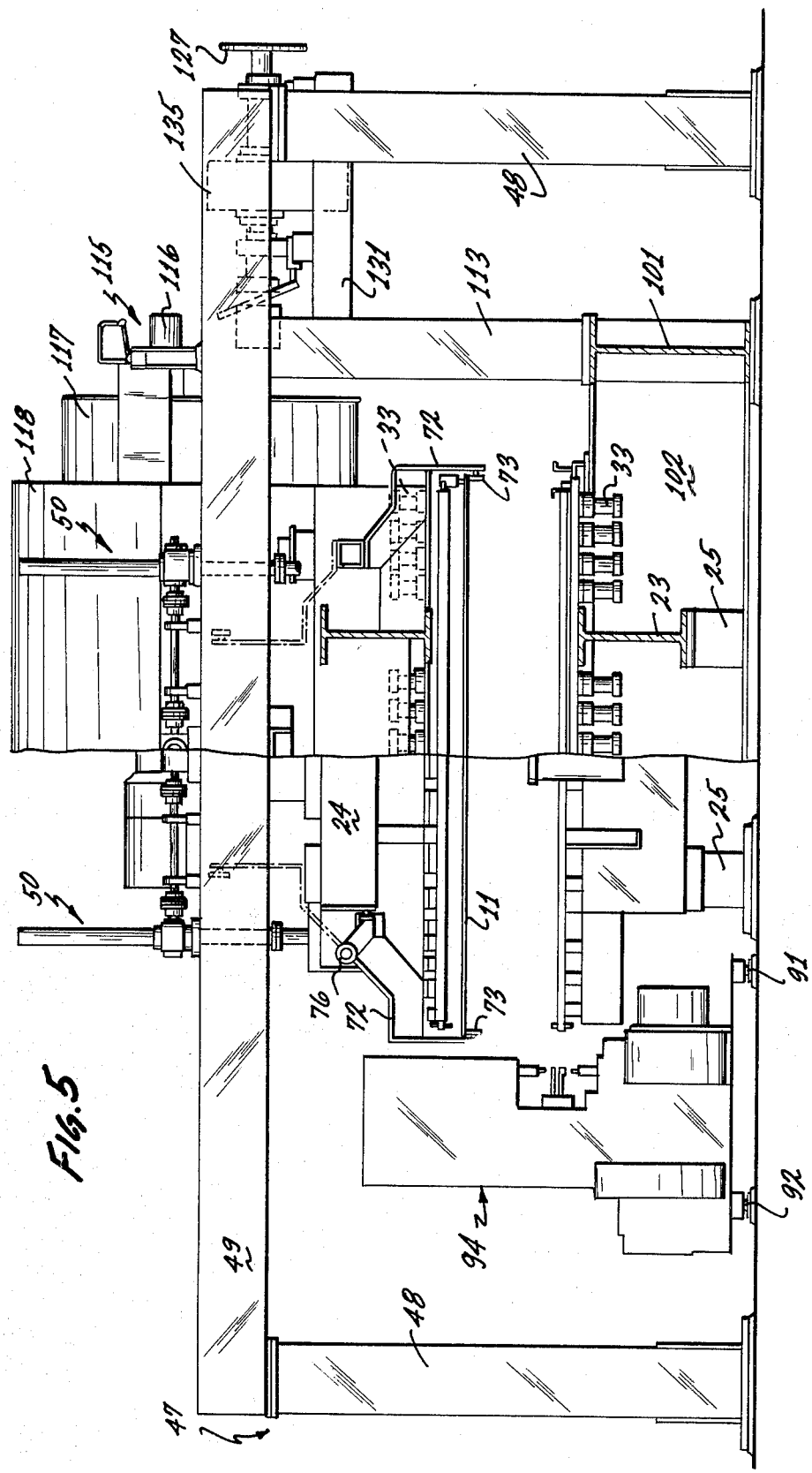

APPARATUS FOR ASSEMBLING WALL MODULES FROM A PAIR OF STRETCHED SHEETS OF METAL LATERALLY SPACED APART BY A SKELETAL FRAME

BACKGROUND OF THE INVENTION

The invention relates to apparatus for assemblying a wall module and more particularly to apparatus for assemblying a wall module from a pair of stretched sheets of metal laterally spaced apart by a skeletal frame with the interior of the wall module to be later filled with structural foamed plastic.

The type of wall module that is being assembled in the novel apparatus is one that is used on a transportation vehicle such as a bus. The wall module is normally used for the roof of such a vehicle although the apparatus has been used to form wall modules for the floor of such a vehicle.

The manufacture of wall modules for a transportation vehicle is unique. The generally accepted method of manufacturing a wall for a vehicle such as a bus is to attach a frame to the chasis of the vehicle and then to cover its inner and outer surfaces.

A method and apparatus for making laminated panels of polystyene foam and aluminum is described in U.S. Pat. No. 3,410,931 but this patent is not directed to making wall modules for a transportation vehicle and the unique problems that would be encountered in making such a wall module.

It is an object of the invention to provide a novel apparatus for assemblying wall modules from sheet metal on a coil.

It is another object of the invention to provide a novel apparatus for stretching sheet metal prior to assemblying it in a wall module.

It is also an object of the invention to provide a novel apparatus for maintaining a pair of sheets of metal in a stretched condition while they are pierced riveted to a skeletal frame sandwiched therebetween.

It is a further object of the invention to provide a novel apparatus having a first elongated sheet metal stretcher assembly mounted vertically over a second elongated sheet metal stretcher assembly.

It is an additional object of the invention to provide a novel method of assemblying a wall module from elongated strips of sheet metal.

SUMMARY OF THE INVENTION

The article to be manufactured by the novel apparatus is a wall module formed from a top sheet and a bottom sheet of sheet metal and having a skeletal metal frame sandwiched therebetween. The skeletal frame has extruded channel members running longitudinally along its lateral edges and the sheets of metal are pierce riveted to these channel members. The interior of the wal module is later filled with structural foam plastic.

The method of assemblying the wall module and the apparatus for assembling the wall module are both unique. The apparatus has a first elongated sheet metal stretcher assembly and a second elongated sheet metal stretcher assembly. Each of the sheet metal stretcher assemblies have sheet metal clamping jaws longitudinally fixedly mounted adjacent one of their ends and have longitudinally movable sheet metal clamping jaws mounted adjacent their other end. The first elongated sheet metal stretcher assembly is supported vertically above the second elongated sheet metal stretcher assembly and there is structure for moving the first elongated sheet metal stretcher assembly vertically toward and away from the second elongated sheet metal assembly.

Each of the elongated sheet metal stretcher frame assemblies have a skeletal framework having a pair of laterally longitudinally extending frame members and a plurality of laterally extending cross frame members whose opposite ends are fixedly secured to the respective longitudinally extending frame members to form a rigid structure. The second elongated sheet metal stretcher assembly has a sheet of plywood secured to the top of the skeletal framework to form a work platform. Carpet fabric covers this work platform to provide a surface that will prevent the bottom surface of the sheet metal that passes thereover from becoming scratched.

Each of the sheet metal clamping jaws has a fixed jaw member and a vertically movable jaw member. Additionally hydraulic pistons are connected to the vertically movable jaw members for reciprocally moving the vertical jaw member toward and away from the fixed jaw member. The longitudinally movable sheet metal clamping jaw assembly has a jack screw assembly connected to one of the fixed jaw members for transporting the longitudinally movable sheet metal clamping jaw assembly in a longitudinal direction away from the longitudinally fixed mounted sheet metal clamping jaw assembly mounted adjacent the other end of the elongated sheet metal stretcher assembly.

The jack screw assemblys comprise a motor having a main drive, a T-coupling gear box connected to the main drive and a pair of secondary drive shafts extending outwardly from the opposite sides of the T-coupling gear box. A jack screw is attached to the free end of each of the secondary drive shafts with one end of each of these jack screws being attached to a laterally extending crossbeam that is fixedly connected to the elongated sheet metal stretcher assembly and the opposite ends of each of the jack screws is attached to the laterally extending abutting beam which is free to travel longitudinally with respect to the elongated sheet metal stretcher assembly.

In operating the apparatus, sheet metal which is wound in a coil and mounted on a mandrel is loaded into a first and second coil rack frame assembly. The sheet metal from these respective coils is wound through their own respective tension roll assemblys and fed along the length of the respective first and second elongated sheet metal stretching frame assemblies. When the required length of sheet metal has been fed into the respective elongated sheet metal stretcher assemblies, the skin cutter assembly on the respective tension roll assemblies is actuated to sever that desired length of sheet metal. One end of each of the sheets is then secured into the sheet metal clamping jaw assembly that is fixedly mounted and the other end of the sheet metal is inserted into the longitudinally movable sheet metal clamping jaw assembly mounted adjacent the other end of the sheet metal stretcher assembly. Next the jack screw assemblys are actuated and the sheet metal is stretched to its desired tension. At this point the two sheets of metal are vertically spaced from each other and the skeletal frame is rolled along the conveyor assembly into the space between the two elongated sheet metal stretcher assemblys. After the skeletal frame has been properly aligned, the upper elongated sheet metal stretcher assembly is lowered until the top sheet is brought in surface contact with the top of the skeletal frame. At this point the pierce rivet machine is transported along its track along side the apparatus and stopped periodically to accomplish the task of pierce riveting the top and bottom sheet to the skeletal frame. When this is accomplished the wall module assembly is removed to another machine where the interior of the wall module will be filled with structural foamed plastic. The apparatus is then ready to assemble another wall module and this process can go on until all of the sheet metal on the coils is finished.

DESCRIPTION OF THE DRAWINGS

FIG. 1 is an exploded perspective view of the novel wall module;

FIG. 2 is a perspective view of the novel wall module in its finished state;

FIG. 3a is a side elevation view of the right end of the apparatus;

FIG. 3b is a side elevation view of the middle portion of the apparatus;

FIG. 3c is a side elevation view of the left end of the apparatus;

FIG. 4a is a top plan view of the apparatus illustrated in FIG. 3a;

FIG. 4b is a top plan view of the apparatus illustrated in FIG. 3b;

FIG. 4c is a top plan view of the apparatus illustrated in FIG. 3c;

FIG. 5 is a section view taken along lines 5—5 of FIG. 4c.

DESCRIPTION OF THE PREFERRED EMBODIMENT

The novel wall module and the apparatus for manufacturing it will be described by referring to the drawings. The wall module is generally designated numeral 10 and it is illustrated in FIGS. 1 and 2. It has a top sheet 11, a bottom sheet 12, and a skeletal frame 13. The skeletal frame 13 has longitudinally extending extruded channel members 14 and laterally extending cross members 15 whose opposite ends are bolted to the extruded channel members 14. Rivets 16 secure top sheet 11 and bottom sheet 12 to the extruded channel members 14. The interior of the wall module in its finished state is filled with structural foamed plastic 17.

The apparatus for assemblying the wall module 10 is generally designated numberal 19 and it will be described by referring to FIGS. 3a, 3b, and 3c. Two of the major components of the apparatus 19 are lower elongated sheet metal stretcher assembly 20 and upper elongated sheet metal stretcher assembly 21. Lower sheet metal stretcher assembly 20 has a skeletal framework formed from a pair of laterally spaced longitudinally extending I-beam frame members 23 and a plurality of laterally extending cross frame members 24 whose opposite ends are fixedly secured to the respective longitudinally extending frame members 23 to form a rigid structure. The rigid structure is fixedly mounted in a stationary position on support members 25 extending upwardly from the floor 26 to position the top surface of the lower sheet metal stretcher assembly a predetermined height above the floor. A sheet 28 of plywood is secured to the top of the rigid structure to form a work platform and the plywood in turn is covered by a carpet fabric to protect the lower surface of the sheet metal from becoming scratched.

The right end of the lower sheet metal stretcher assembly 20 has a longtiudinally fixedly mounted sheet metal clamping assembly 30 attached to its top surface. Sheet metal clamping assembly 30 has a fixed lower jaw member 31 and a vertically movable upper jaw member 32. Both jaw member 31 and jaw member 32 extend laterally across the width of the sheet metal stretcher assembly 20. Attached to the bottom surface of the sheet metal clamping assembly 30 are a plurality of hydraulic cylinders 33 that are laterally spaced across the width of the lower jaw member 31. The piston rod of these hydraulic cylinders 33 pass through apertures in the lower jaw member 31 and have their ends fixedly secured to the lower surface of upper jaw member 32. The travel of the piston rod would be approximately ½" which is all that would be necessary in order to insert the end of sheet metal strip 12 therein.

At the left end of the lower sheet metal stretcher assembly 20 is found a longitudinally movable sheet metal clamping assembly 34. It has a fixed lower jaw member 35 and a vertically movable upper jaw member 36. A plurality of hydraulic cylinders 37 are mounted on the bottom surface of fixed lower jaw member 35. The piston rods of these hydraulic cylinders pass upwardly through apertures in the lower jaw member 35 and have their top ends fixedly secured to the lower surface of upper jaw member 36. The vertical travel of the piston rods is approximately 1 ½" which is all that is necessary in order to insert the end of the metal sheet 12.

A jack screw assembly 39 is attached to sheet metal clamping assembly 34 to make it longitudinally movable. A jaw plate 40 extends across the width of the rigid frame and has its forward edge fixedly secured to lower jaw member 35 and its rearward edge secured to the top of abutting beam 41. A pair of laterally spaced jack screws 43 have their one end secured to abutting beam 41 and their other end secured to lateral cross member 44. The jack screw assembly 39 also has a motor 45, a T-coupling gear box 46, a pair of secondary drive shafts 47 extending outwardly from the opposite sides of the T-coupling gear box, and one end of each of the jack screws are attached to the free end of the secondary drive shafts 47. It will be easily understood that when the jack screws are rotated in one direction the jaw plate 40 will be caused to travel toward the left while also bringing with it the sheet material clamping assembly 34. By varying the distance that jaw plate 40 travels, the tension on sheet 12 and the amount of the stretching thereof can be controlled. Guidebars 49 help to control the alignment of the jack screw assembly as it travels longitudinally back and forth. Also mounted on the lower sheet metal stretcher assembly 20 is a squaring bar 50 at each of its ends for insuring the opposite ends of the cut section of sheet metal 12 has 90° edges. The squaring bars 50 may also be used for squaring the ends of the skeletal frame 13 prior to attaching the stretched metal sheets 11 and 12 to the channel members 14.

The upper sheet metal stretcher assembly 21 also has a skeletal framework similar to that of the lower sheet metal stretcher assembly 20. It has a pair of laterally spaced longitudinally extending I-beam frame members 23 and a plurality of laterally extending cross frame members 24 whose opposite ends are fixedly secured to the respectively longitudinally extending frame members to form a rigid structure. Upper sheet metal stretcher assembly 21 also has a longitudinally fixedly mounted sheet metal clamping assembly 30 adjacent its right end and a longitudinally movable sheet metal clamping assembly 34 adjacent its left end. The sheet metal clamping assembly 30 attached to the upper sheet metal stretcher assembly 21 is identical to the sheet metal clamp assembly 30 attached to the lower sheet metal stretcher assembly 20 and the only difference would be that it is inverted so that in operation, vertically movable jaw 32 would be the lower jaw. Likewise, sheet metal clamping assembly 34 attached to the left end of upper sheet metal stretcher assembly 21 is identical to its counter part on the lower sheet metal stretcher assembly with the only difference being that it has also been turned upside down in its orientation.

The structure for supporting upper sheet metal stretcher assembly 21 is best illustrated in FIGS. 4a, 4b, 4c and 5. This basic structure is comprised of a plurality of longitudinally spaced tower assemblys 47. Each tower assembly 47 has a vertical support member 48 extending upwardly from the opposite lateral sides of the upper sheet metal stretcher assembly 21 and they also have a cross beam member 49 connected to the top of the vertical support members 48.

The structure for moving the upper sheet metal stretcher assembly 21 vertically comprises a plurality of laterally spaced jack screw assemblies 50 supported at their mid-section by cross beams 49 and having their lower ends secured to the framework of the upper sheet metal stretcher assembly 21. A longitudinally extending beam 52 connects the two tower assemblies 47. Mounted atop beam 52 is structure which allows the jack screw assemblys 50 to be driven in unison. This structure includes the primary drive shaft assembly 54 and the secondary drive shaft assemblys 55. The primary drive shaft assembly 54 has a motor 56 whose shaft extends into T-coupling gear box 57 and extending laterally out of gear box 57 are short shaft members 58 whose ends are captured by couplings 59. Also captured in couplings 59 are the ends of the drive shafts 60 and drive shafts 60 are journaled in bearings 61. The opposite ends of drive shaft 60 are journaled in bearings 62 and are secured to couplings 63. Also secured to couplings 63 are short drive shafts 64 which extend outwardly from T-coupling gear boxes 66. The T-coupling gear box 66 is a component of the secondary drive shaft assembly 55 which allows the laterally spaced jack screw assemblys 50 to be driven in unison. The secondary drive shaft assembly comprises laterally extending drive shafts 68 that extend from the T-coupling gear box 66 and which have their opposite ends geared to the jack screw assemblys 50. Bearings 69 support the laterally extending drive shaft 68.

The upper sheet metal stretcher assembly 21 also has structure attached to its opposite lateral sides to support a plurality of longitudinally spaced skeletal frame holding arms 72. The lower end of the holding arms 72 have a roller 73 having a horizontal axis mounted on the interior side thereof for at times supporting the skeletal frames and at other times the metal sheet 11. The top of the holding arms 72 are attached to a secondary drive shaft assembly 75. The secondary drive shaft assembly 75 comprises a plurality of drive shaft members 76 secured to short shaft sections 77 by couplings 78. The drive shafts are supported in brackets attached to the lateral sides of the upper sheet metal stretcher assembly 21. The holding arms 72 are pivotally mounted in brackets (see FIG. 5) so that they may be swung up out of the way when not needed for performing the previously mentioned functions. Each secondary drive shaft assembly 75 is driven by its own pneumatic rotary actuator 80. The pneumatic rotary actuators 80 are synchronized so that the holding arms are pivoted into and out of position on both lateral sides in unison.

At the forward end of the apparatus 19 is an alignment pin extending downwardly from the upper sheet metal stretcher assembly 21 that aligns with an aligning bore hole 84 that faces upwardly on the top surface of the lower sheet metal stretcher assembly 20. Also at the rear end of the apparatus 19 is a second alignment structure. This one consists of an alignment pin 86 extending downwardly from the upper sheet metal stretcher assembly 21 that mates with a bore hole 87 in the vertical stop limit assembly 88 mounted on the top surface of the lower sheet metal stretcher assembly 20.

Extending longitudinally along the lateral sides of the apparatus 19 are a pair of tracks 90 having spaced rails 91 and 92. Operated on these tracks are the pierce rivet machines 94 which are used to secure the sheets of metal 11 and 12 to the extruded channel members 14.

At the forward end of the apparatus is found the conveyor assembly frame 100. It is comprised of a pair of laterally spaced I-beam members 101 that have a plurality of laterally extending cross frame members 102 attached therebetween. Extending longitudinally along the top of the conveyor frame assembly is the conveyor assembly 104. It has a pair of laterally spaced longitudinally extending frame members 105 that receive the opposite ends of the shafts extending outwardly from rollers 106.

Mounted atop conveyor assembly frame 100 are coil rack frame assemblys 110 and 112. Coil rack frame assembly 110 has vertical support members 113 and a cross beam support member 114. Mounted on cross beam support member 114 is a hinged pillow block bearing 115. Received within bearings 115 are shafts 116 that extend outwardly from mandrels 117 upon which is wound sheet 11 in a coil.

When the sheet metal 11 on coil 118 has been completely used up, a new coil would be loaded into coil rack frame assembly 110. This would be accomplished by releasing the locking mechanism 120 of the hinged pillow block bearings 115 and pivoting the top of the bearing 115 about its hinge pin 122. Next the tension brake assembly 123 would be actuated to withdraw the protrusion on disc 124 from the key slot 125 formed in the end of shaft 116 of the mandrel 117. When that has been accomplished the mandrel 117 may be removed from the coil rack frame assembly 110.

When a new coil is to be put into coil rack frame assembly 110, it would be lowered in place and the wheel 127 on shaft 128 would be turned to align the protrusion on disc 124 with the key slot 125 of the new mandrel. Shaft 128 is mounted in bearings 129 that are supported on cross beam support members 130 on laterally extending support members 131.

Tension brake assembly 123 also has a reducer 135 mounted on shaft 128. A bracket 137 is attached to the underside of laterally extending support beam 131 and it is attached to the torque arm 138 that acts to prevent the reducer from rotating. Torque arm 138 has its other end secured to the reducer to perform its task. Bracket 140 is secured to the underside of the other laterally extending support beam 131 and it is connected to torque arm 142 whose function is to hold the brake assembly and keep it from rotating. Brake assembly 144 is attached to the end of torque arm 142. The structure of coil rack frame assembly 110 is identical to that of coil rack frame assembly 112 and similar numbers are denoted to identify similar structures.

Support arms 150 extend from coil rack frame assembly 110 and support the tension roll assembly 152. The tension roll assembly has a motor 153, a gear box 154, an idler roll 155, and a traction drive roll 156. Sheet 11 is threaded between idler roll 155 and the traction drive roll 156. A cross beam 158 has a skin cutter assembly 160 attached to it for severing the desired length of sheet metal from the coil. Supported between the vertical support members 113 and below the tension roll assembly is a table 162. The tension roll assembly 166 that is mounted on support arms 168 extending from coil rack frame assembly 112 is identical to tension roll assembly 152. Therefore its structure will not be described although similar numbers are used on both assemblys to identify like structure.

The operation of apparatus 19 whose purpose is to stretch sheets of metal and then hold them during the riveting operation while a wall module is being formed will now be described. Initially coils of sheet metal on mandrels are loaded into the coil racks and the tension brake assemblys are engaged. One coil is loaded into the apparatus at a time and when the first coil is loaded into coil rack frame assembly 110 the upper sheet metal stretcher assembly 21 would be raised to its highest position. Then the tension rolls 155 and 156 would be opened and the sheet metal fed between the rolls. After the rolls are closed, the starting edge of the coil would be trimmed. Next drive traction roll 156 would be actuated to uncoil a full length of sheet and while this is occurring the operator would manually guide the forward edge of the sheet until it reaches the cut to length mark. At this point the front edge would be trimmed at the squaring bar. The upper sheet metal stretcher assembly would then be lowered to about 2" above the jaws of the lower sheet metal stretcher assembly. Next the upper longitudinally movable jaw assembly 34 would be driven toward coil rack 110. The one end of the sheet is then inserted into the upper movable jaw assembly 34 and aligned. The other end of the sheet would then be inserted into the upper fixed jaw assembly 30 and once the alignment has been checked the fixed jaw assembly would be clamped and then the movable jaw assembly would be clamped. After this the sheet would be stretched to a predetermined tension after the roller arms had been swung down to contain the sheet. Now the tension on the sheet is relaxed to the load needed for riveting.

The upper stretcher assembly 21 would then be raised to its highest position. The procedure followed previously for the first sheet of aluminum would be followed with the sheet of aluminum from the second coil until it was properly tensioned and then relaxed to the load needed for riveting. Next the upper metal stretching frame would be lowered to the height needed to receive the skeletal frame from the frame building station. The skeletal frame would be pushed into the apparatus and stopped about 12" beyond the movable jaw assemblys 34. The upper sheet metal stretcher assembly would then be lowered to its lowers position and the roller arms would be swung up out of the way. The pierce rivet machines would now be positioned to drive the first rivet. The pierce rivet machines would then be intermittently driven down the lateral sides of the apparatus and at each stop a rivet would be inserted through the respective members. When the wall module has been completely riveted down both lateral sides, the pierce rivet machines would be retracted fully out of position and the remaining tension on the sheets would be released by unclamping all the jaw assemblys. The roller arms are swung down and the upper sheet metal stretcher assembly would be raised until the rollers just carry the weight of the riveted wall panel. The wall panel would then be unloaded and the whole operation can be repeated to form the next wall module.

What is claimed is:

1. Apparatus for assembling a wall module from a plurality of stretched sheets of metal laterally spaced apart by a skeletal frame with the interior of the wall module to be later filled with structural foamed plastic comprising:

a first elongated sheet metal stretcher assembly having first sheet metal clamping means that are longitudinally fixedly mounted adjacent one of its ends and having second sheet metal clamping means mounted adjacent its other end, and means for adjustably moving said second sheet metal clamping means in the longitudinal direction, a second elongated sheet metal stretcher assembly having first sheet metal clamping means that are longitudinally fixedly mounted adjacent one of its ends and having further sheet metal clamping means mounted adjacent its other end, and means for adjustably moving said further sheet metal clamping means in the longitudinal direction, means for supporting said first elongated sheet metal stretcher assembly vertically above said second elongated sheet metal stretcher assembly, means for moving one of said elongated sheet metal stretcher assemblys vertically toward or away from said other elongated sheet metal stretcher assembly, and a plurality of longitudinally spaced skeletal frame holding arms attached to the opposite lateral sides of said first elongated sheet metal stretcher assembly.

2. Apparatus for assembling a wall module as recited in claim 1 wherein said first elongated metal stretching frame assembly comprises a skeletal framework having a pair of spaced longitudinally extending frame members and a plurality of laterally extending cross frame members whose opposite ends are fixedly secured to said respective longitudinally extending frame members to form a rigid structure.

3. Apparatus for assembling a wall module as recited in claim 1 wherein said second elongated sheet metal stretcher frame assembly comprises a skeletal framework having a pair of laterally spaced longitudinally extending frame members and a plurality of laterally extending cross frame members whose opposite ends are fixedly secured to said respective longitudinally extending frame members to form a rigid structure.

4. Apparatus for assembling a wall module as recited in claim 3 wherein said skeletal framework is mounted on support members to position the top of said elongated metal stretching frame assembly a predetermined height above the floor.

5. Apparatus for assembling a wall module as recited in claim 3 wherein said second elongated sheet metal stretcher assembly further comprises a sheet of material secured to the top of said skeletal framework to form a work platform.

6. Apparatus for assembling a wall module as recited in claim 5 wherein said second elongated sheet metal stretcher assembly further comprises carpet fabric covering said work platform.

7. Apparatus for assembling a wall module as recited in claim 1 wherein each of said sheet metal clamping means comprises a fixed jaw member and a vertically movable jaw member.

8. Apparatus for assembling a wall module as recited in claim 7 wherein said sheet metal clamping means further comprises hydraulic piston means connected to said vertically movable jaw members for reciprocally moving said vertically movable jaw member toward and away from said fixed jaw member.

9. Apparatus for assembling a wall module as recited in claim 5 further comprising a pair of frame squaring bars mounted adjacent each of the opposite ends of said second elongated metal stretching frame assembly for squaring the skeletal frame of the wall module prior to attaching the stretched metal sheets to its top and bottom sides.

10. Apparatus for assembling a wall module as recited in claim 7 wherein said longitudinally movable sheet metal clamping means comprises a jack screw assembly connected to one of said fixed jaw members for transporting said longitudinally movable sheet metal clamping means in a longitudinal direction away from said longitudinally fixedly mounted sheet metal clamping means mounted adjacent the other end of said second elongated sheet metal stretcher assembly.

11. Apparatus for assembling a wall module as recited in claim 10 wherein said jack screw assembly comprises a motor having a main drive shaft, a T-coupling gear box connected to said main drive shaft, a pair of secondary drive shafts extending outwardly from the opposite sides of said T-coupling gear box, and a jack screw attached to the free end of each of said secondary drive shafts, one end of each of said jack screws is attached to a laterally extending cross beam that is fixedly connected to said first elongated sheet metal stretcher assembly and the opposite ends of each of said jack screws is attached to a laterally extending abutting beam which is free to travel longitudinally with respect to said first elongated sheet metal stretcher assembly.

12. Apparatus for assembling a wall module as recited in claim 1 wherein said skeletal frame holding arms each have a roller having a horizontal axis mounted on the interior side of said skeletal frame holding arms for supporting the skeletal frame.

13. Apparatus for assembling a wall module as recited in claim 12, wherein said skeletal frame holding arms are pivotally attached to said first elongated sheet metal stretcher assembly.

14. Apparatus for assembling a wall module as recited in claim 13, further comprising means for pivoting said skeletal frame holding arms into and out of position in unison.

15. Apparatus for assembling a wall module as recited in claim 1 further comprising a first coil rack frame assembly mounted longitudinally adjacent one end of said first elongated sheet metal stretcher assembly for receiving a first coil of sheet metal.

16. Apparatus for assemblying a wall module as recited in claim 15 further comprising a second coil rack frame assembly mounted longitudinally adjacent one end of said second elongated sheet metal stretcher assembly for receiving a second coil of sheet metal.

17. Apparatus for assembling a wall module as recited in claim 16 wherein both said first and second coil rack frame assemblys are mounted on a conveyor frame assembly.

18. Apparatus for assembling a wall module as recited in claim 17 further comprising a conveyor assembly longitudinally mounted on said conveyor frame assembly.

19. Apparatus for assembling a wall module as recited in claim 15 further comprising a tension brake assembly mounted on said first coil rack assembly for controlling the feeding of a coil of sheet metal mounted in said first coil rack assembly.

20. Apparatus for assembling a wall module as recited in claim 15 further comprising a first tension roll assembly mounted longitudinally adjacent one end of said first elongated sheet metal stretcher assembly for drawing the desired length of sheet metal off a coil of sheet metal.

21. Apparatus for assembling a wall module as recited in claim 20 wherein said first tension roll assembly further comprises a skin cutter for shearing off at any desired length the sheet metal on a coil of sheet metal.

22. Apparatus for assembling a wall module from a plurality of stretched sheets of metal laternally spaced apart by a skeletal frame with the interior of the wall module to be later filled with structural foamed plastic comprising:
a first elongated sheet metal stretcher assembly having first sheet metal clamping means that are longitudinally fixedly mounted adjacent one of its ends and having second sheet metal clamping means mounted adjacent its other end, and means for adjustably moving said second sheet metal clamping means in the longitudinal direction,
a second elongated sheet metal stretcher assembly having first sheet metal clamping means that are longitudinally fixedly mounted adjacent one of its ends and having further sheet metal clamping means mounted adjacent its other end and means for adjustably moving said further sheet metal clamping means in the longitudinal direction,
means for supporting said first elongated sheet metal stretcher assembly vertically above said second elongated sheet metal stretcher assembly comprising a plurality of longitudinally spaced towers, said towers each having a vertical support member extending upwardly from opposite lateral sides of said first elongated sheet metal stretcher assembly and also having a cross-beam member connected to the top of said vertical support members,
means for moving one of said elongated sheet metal stretcher assemblys vertically toward and away from said other elongated sheet metal stretcher assembly, comprising a plurality of laterally spaced jack-screw assemblys supported by said cross-beam members with their lower ends attached to said first elongated sheet metal stretcher assembly, and
laterally oriented secondary drive shaft means connecting said laterally spaced jack-screw assemblys together whereby the laterally spaced jack-screws are driven in unison.

23. Apparatus for assembling a wall module as recited in claim 22 further comprising longitudinally extending primary drive shaft means coupled at its opposite ends to said laterally oriented secondary drive shaft means whereby all the longitudinally spaced sets of laterally spaced jack screws are driven in unison.

24. Apparatus for assembling a wall module as recited in claim 23 further comprising a motor coupled to said longitudinally extending primary drive shaft means intermediate its length.

* * * * *